United States Patent
Omori

(10) Patent No.: US 11,768,478 B2
(45) Date of Patent: Sep. 26, 2023

(54) PROCESSING APPARATUS

(71) Applicant: DISCO CORPORATION, Tokyo (JP)

(72) Inventor: Takafumi Omori, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 17/653,770

(22) Filed: Mar. 7, 2022

(65) Prior Publication Data

US 2022/0299970 A1    Sep. 22, 2022

(30) Foreign Application Priority Data

Mar. 18, 2021  (JP) .................................. 2021-045214

(51) Int. Cl.
  *G05B 19/402*  (2006.01)
  *G05B 19/4063*  (2006.01)
  *G05B 19/4068*  (2006.01)

(52) U.S. Cl.
  CPC ....... *G05B 19/402* (2013.01); *G05B 19/4063* (2013.01); *G05B 19/4068* (2013.01)

(58) Field of Classification Search
  None
  See application file for complete search history.

(56) References Cited

U.S. PATENT DOCUMENTS 6,233,719 B1 * 5/2001 Hardikar ............... G06F 16/906
                                                                 700/110
2010/0131892 A1    5/2010 Kang et al.

FOREIGN PATENT DOCUMENTS

JP          2009194326 A       8/2009

OTHER PUBLICATIONS

Search report issued in counterpart Singapore patent application No. 10202202180S, dated Jul. 18, 2023.

* cited by examiner

*Primary Examiner* — Ryan A Jarrett
(74) *Attorney, Agent, or Firm* — Greer Burns & Crain Ltd.

(57) ABSTRACT

A control unit of processing apparatus includes a processing condition storing section that stores processing condition data of the processing apparatus and a display control section that causes a display part to display a processing condition screen relating to the processing condition data. The display control section causes the processing condition screen to display function objects that allow identification of functions to be executed on the basis of the processing condition data by the processing apparatus.

13 Claims, 9 Drawing Sheets

DETAILED SETTING SCREEN

DEVICE DATA NO. [      ] / [1218]
ID [2020_12_10_]          BLADE HEIGHT 1 [0.050] mm  2 [0.050] mm
                          FEED RATE    [100.000] mm/s
SPINDLE
ROTATION SPEED Z1 [30000]/min Z2 [30000]/min   INDEX  Ch1 [5.000000] mm  Ch2 [5.000000] mm --- WORK SHAPE AND SIZE(ROUND SQUARE) ---
    [ROUND ▼]
ROUND WORK    [203.200] mm
SQUARE WORK Ch1 [0.000] mm   Ch2 [0.000] mm          711 — [ ENTER ]

THICKNESS  WORK [0.600] mm  TAPE [0.070] mm          712 — [ EXIT ]

PROCESSING APPARATUS

BACKGROUND OF THE INVENTION

Field of the Invention

The present invention relates to a processing apparatus.

Description of the Related Art

In a processing apparatus of a semiconductor or the like, functions that can be executed by the respective units are different depending on the apparatus. In the processing apparatus, when a device that is the target of processing changes, operation of the respective units executed in processing and order thereof also change. For example, Japanese Patent Laid-open No. 2009-194326 discloses a technique in which a series of operation items that require setting operation by an operator from the processing start for a workpiece to the processing end are roughly classified by category and are displayed in such a manner as to be diagrammatically represented in a time-series manner in order in which the setting operation is required.

SUMMARY OF THE INVENTION

In the related processing apparatus, plural screens exist as screens for setting functions that can be executed by the respective units and therefore it is difficult for an operator to check the functions with which the processing apparatus that is being operated is equipped. Furthermore, plural screens exist also as screens for setting the processing condition, which is complicated. Therefore, it is difficult for the operator to image whether the processing apparatus executes processing with correct operation and order under the set processing condition.

Thus, an object of the present invention is to provide a processing apparatus with which it is possible to efficiently check and set functions to be executed based on the processing condition in plural functions that are executable.

In accordance with an aspect of the present invention, there is provided a processing apparatus including a holding table that holds a workpiece, a processing unit that processes the workpiece held by the holding table, a control unit that drives the processing unit, and a display part that displays information relating to processing. The control unit includes a processing condition storing section that stores processing condition data of the processing apparatus and a display control section that causes the display part to display a processing condition screen relating to the processing condition data. The display control section causes the processing condition screen to display function objects that allow identification of functions to be executed on the basis of the processing condition data by the processing apparatus.

Preferably, the display control section causes the processing condition screen to display the function objects of the functions to be executed based on the processing condition data by the processing apparatus and second function objects of functions that are not to be executed in different display forms.

Preferably, the display control section causes the processing condition screen to display the function objects of the functions to be executed based on the processing condition data by the processing apparatus in such a manner as to line up the function objects in order of execution.

Preferably, the processing condition screen includes a screen that allows change in a function to be executed and order of a function to be executed, and the control unit further includes a change section that changes a function that is not to be executed to a function to be executed when the second function object of the function that is not to be executed is moved to a position adjacent to the function object of a function to be executed in the processing condition screen.

The processing apparatus of the invention of the present application provides an effect that it is possible to efficiently check and set functions to be executed based on the processing condition in plural functions that are executable.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 6 is a diagram illustrating one example of a detailed setting screen of the processing apparatus according to the embodiment;

DETAILED DESCRIPTION OF THE PREFERRED EMBODIMENT

An embodiment according to the present invention will be described in detail below with reference to the drawings. The present invention is not limited by contents described in the following embodiment. Furthermore, what can be easily envisaged by those skilled in the art and what are substantially the same are included in constituent elements described below. Moreover, configurations described below can be combined as appropriate. In addition, various kinds of omission, replacement, or change of a configuration can be carried out without departing from the gist of the present invention. In the following embodiment, overlapping description is omitted through giving the same numeral to the same part.

In the embodiment described below, an XYZ orthogonal coordinate system is set and a positional relation among the respective parts will be described with reference to this XYZ orthogonal coordinate system. One direction in the horizontal plane is defined as an X-axis direction. The direction orthogonal to the X-axis direction in the horizontal plane is defined as a Y-axis direction. The direction orthogonal to each of the X-axis direction and the Y-axis direction is defined as a Z-axis direction. The XY-plane including the X-axis and the Y-axis is parallel to the horizontal plane. The Z-axis direction orthogonal to the XY-plane is the vertical direction.

Figure 1:
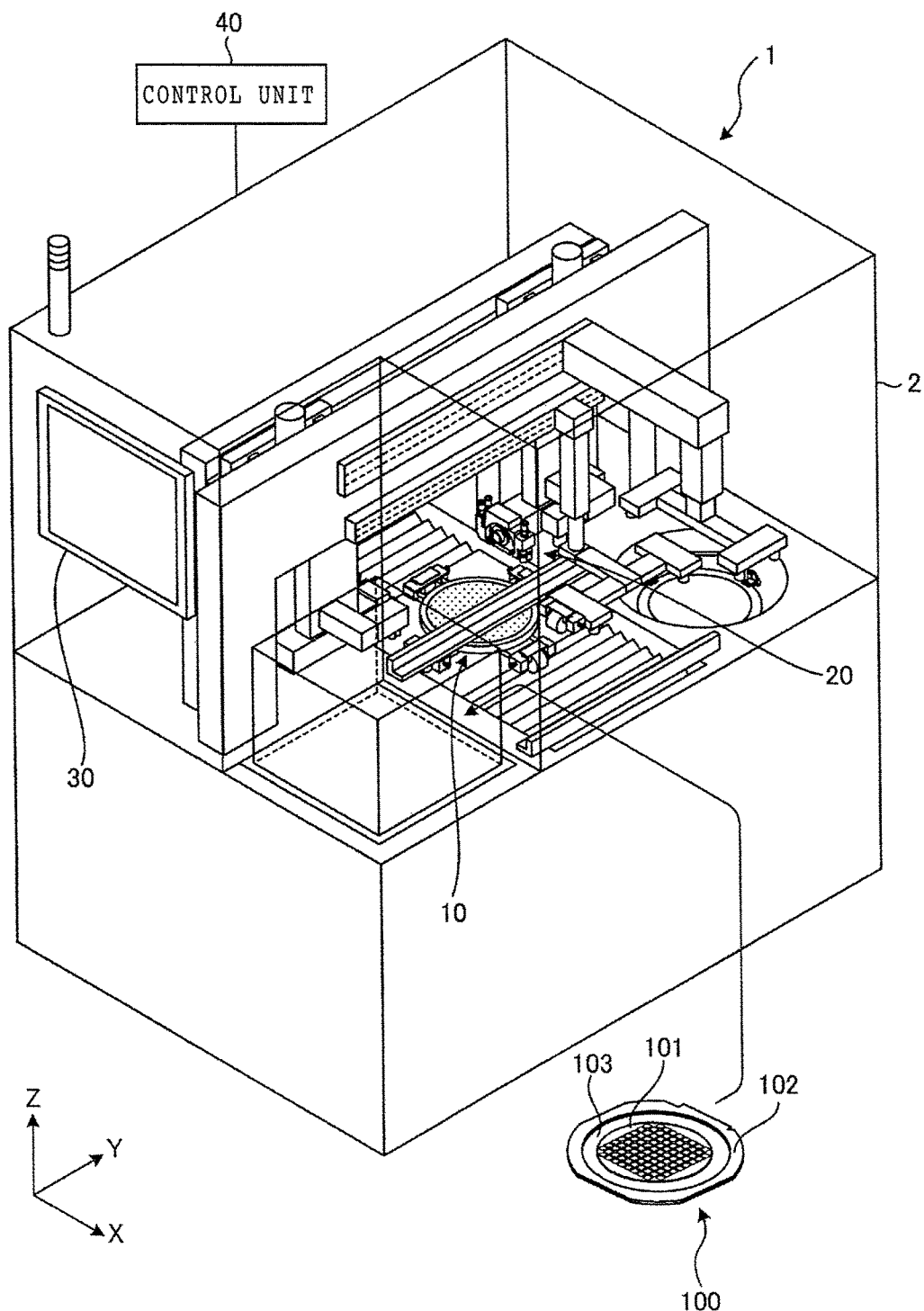
FIG. 1 is a perspective view illustrating a configuration example of processing apparatus according to an embodiment.
Figure 2:
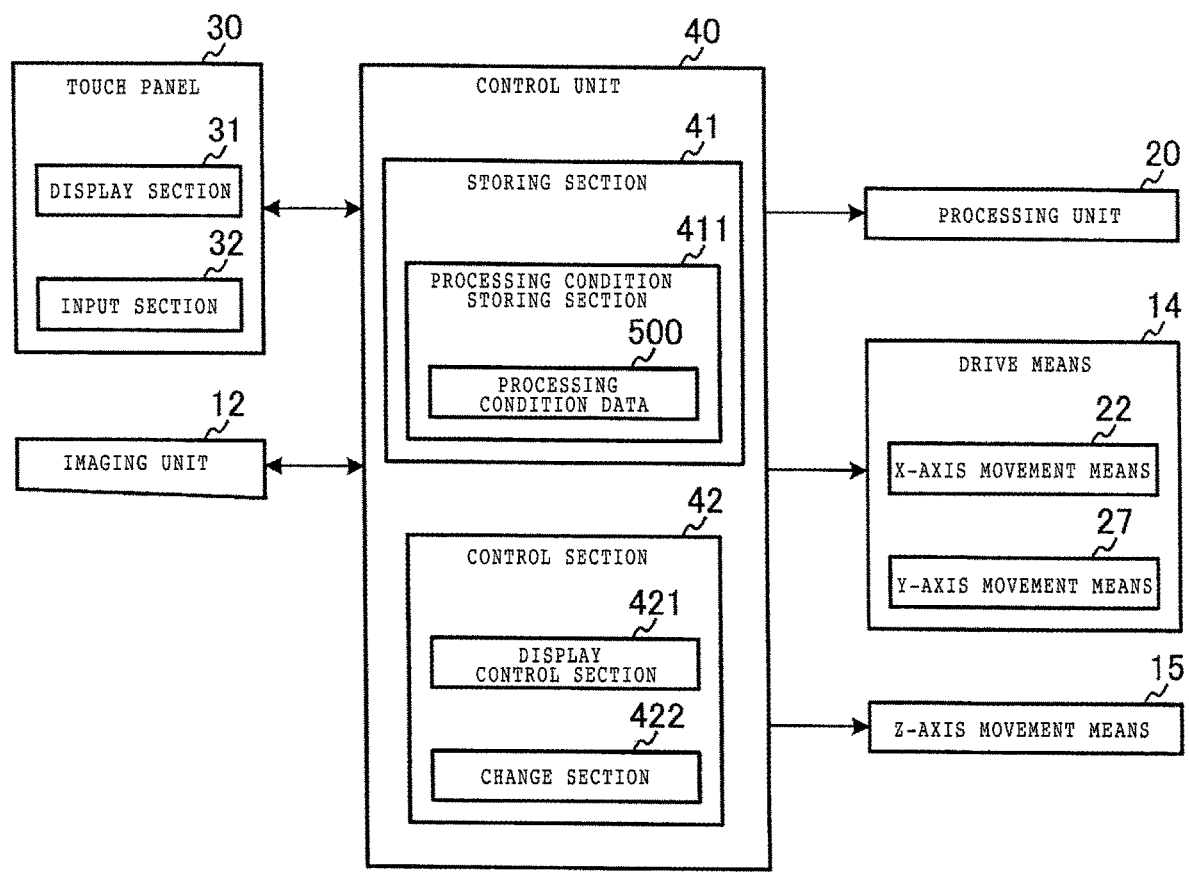
FIG. 2 is a block diagram schematically illustrating one example of the functional configuration of the processing apparatus according to the embodiment.

A processing apparatus according to the embodiment of the present invention will be described based on drawings. FIG. 1 is a perspective view illustrating a configuration example of the processing apparatus according to the embodiment. FIG. 2 is a block diagram schematically illustrating one example of the functional configuration of the processing apparatus according to the embodiment.

As illustrated in FIG. 1, a processing apparatus 1 according to the embodiment includes a main body 2 that is a box-shaped housing. The processing apparatus 1 includes a holding table 10, a processing unit 20, a touch panel 30, and a control unit 40. The control unit 40 is electrically connected to the holding table 10, the processing unit 20, and the touch panel 30.

A workpiece 100 that is a processing target of the processing apparatus 1 is, for example, a circular plate-shaped semiconductor wafer or optical device wafer including silicon, sapphire, gallium arsenide, or the like as a substrate 101. The workpiece 100 is configured through supporting the substrate 101 in an opening of an annular frame 102 through an adhesive tape 103.

The holding table 10 holds the workpiece 100 by a holding surface 11. The holding table 10 communicates with a suction source that is not illustrated in the diagram, and sucks and holds the workpiece 100 by a negative pressure supplied from the suction source. The holding table 10 can move along the X-axis direction by X-axis movement means 22 to be described later and can rotate around the Z-axis by a rotational drive source that is not illustrated in the diagram. The holding table 10 is a chuck table, for example.

In the present embodiment, as illustrated in FIG. 2, the processing apparatus 1 further includes an imaging unit 12, drive means 14, and Z-axis movement means 15. The control unit 40 is electrically connected to the imaging unit 12, the drive means 14, and the Z-axis movement means 15.

As illustrated in FIG. 1 and FIG. 2, the imaging unit 12 is an electronic microscope equipped with an image sensor of a charge coupled device (CCD), a complementary metal oxide semiconductor (CMOS), or the like. The imaging unit 12 images the surface of the workpiece 100 held on the holding surface of the holding table 10. The imaging unit 12 is integrated by being attached to and supported by part of a housing for the processing unit 20 and is disposed to be movable in the Z-axis direction by the Z-axis movement means 15 based on a ball screw, a nut, a pulse motor, and so forth. The imaging unit 12 may include a light source that irradiates the surface of the workpiece 100 held by the holding surface of the holding table 10 with illumination light, for example.

The processing unit 20 processes the workpiece 100 held by the holding table 10. The processing unit 20 is, for example, a pair of cutting means and the cutting means each have a cutting blade. The respective cutting blades of the pair of cutting means are opposed to each other in the Y-axis direction and each rotate around the Y-axis. The processing unit 20 executes cutting processing for the workpiece 100 by the cutting blade that rotates. The processing unit 20 can move along the Y-axis direction by Y-axis movement means 27 and can move along the Z-axis direction by the Z-axis movement means 15. The Y-axis movement means 27 that moves the imaging unit 12 and the processing unit 20 in the Y-axis direction relative to the holding surface of the holding table 10 is composed of a ball screw, a nut, a pulse motor, and so forth and configures the drive means 14 with the X-axis movement means 22.

The processing apparatus 1 processes the workpiece 100 held by the holding table 10 by relatively moving the holding table 10 and the processing unit 20 by the X-axis movement means 22, the Y-axis movement means 27, and the Z-axis movement means 15.

The processing unit 20 included in the processing apparatus 1 is not limited to the cutting unit that executes cutting processing of the workpiece 100 by the cutting blade. As other units, the processing unit 20 may be, for example, a grinding unit that executing grinding processing of the similar workpiece 100 by grinding abrasive stones or the like, a polishing unit that executes polishing processing of the similar workpiece 100 by a polishing pad or the like, a laser processing unit that executes laser processing through irradiating the similar workpiece 100 with a laser beam, and so forth.

The touch panel 30 is set on the main body 2 in the state in which a display surface is oriented outward as illustrated in FIG. 1. The touch panel 30 is disposed at a place where the touch panel 30 is easy to view and operate in the main body 2 of the processing apparatus 1. Under control by the control unit 40, the touch panel 30 displays an image of the surface of the workpiece 100 imaged by the imaging unit 12 and various kinds of information necessary for processing treatment and accepts input operation and so forth necessary for processing treatment from an operator. In the present embodiment, the touch panel 30 is one example of the display part. A panel of an information terminal such as a wearable device, a smartphone, a tablet terminal, or a computer connected to the processing apparatus 1 in a wired or wireless manner may be caused to function as the touch panel 30.

As illustrated in FIG. 2, the touch panel 30 has a display section 31 that displays various kinds of information relating to the processing apparatus 1 and an input section 32 that accepts various kinds of operation input relating to the processing apparatus 1, such as setting input of a processing condition, from an operator. The display section 31 has a display device such as a liquid crystal display or an organic electro-luminescence (EL) display, for example. The input section 32 has a touch screen to specify the contact position or coordinates of a thing in the display surface of the display device, for example.

In the present embodiment, the case in which the touch panel 30 is one example of an output part that outputs various kinds of information will be described. However, the configuration is not limited thereto. For example, the output part of the processing apparatus 1 may be electronic equipment such as a speaker or a communication device.

The control unit 40 includes a storing section 41 and a control section 42. In the present embodiment, the case in which the control unit 40 is a unit including the storing section 41 and the control section 42 will be described. However, the configuration is not limited thereto. For example, a configuration in which the control unit 40 includes only the control section 42 and does not include the storing section 41 may be employed. In this case, a configuration in which the control unit 40 is electrically connected to a storing device equivalent to the storing section 41 is employed. The storing device includes a storing device that can be accessed by the processing apparatus 1, such as a computer and electronic equipment outside the processing apparatus 1 and another piece of the processing apparatus 1, for example.

The storing section 41 stores a program to implement functions of various kinds of processing executed by the control unit 40, data used for processing by this program, and so forth. The storing section 41 is electrically connected to the control unit 40. The storing section 41 can be implemented by a hard disk drive (HDD), a semiconductor memory, or the like. The storing section 41 may be used also as a temporary work area when the control section 42 included in the control unit 40 executes a command described in a control program. As the storing section 41, a storing device that can be accessed by the control unit 40 of the processing apparatus 1, such as computer and electronic equipment outside the processing apparatus 1 and another piece of processing apparatus 1, can be employed.

The storing section 41 has a processing condition storing section 411. The processing condition storing section 411 stores plural pieces of processing condition data 500 of the processing apparatus 1, and so forth. For example, the processing condition data 500 includes data that indicates processing conditions, machine settings, and so forth of various workpieces 100. For example, the processing condition data 500 includes data that indicates processing conditions and so forth input and set by an operator. The processing condition storing section 411 can store the processing condition data 500 corresponding to the flow from processing preparation to the processing end in association with the order of execution. The processing condition data 500 includes data of detailed conditions and so forth of functions and has a configuration that allows setting of whether or not to execute the functions on the basis of the detailed conditions. The processing condition data 500 is stored in the processing condition storing section 411 in such a manner that the relative order of the functions and the other functions can be identified.

The control section 42 controls the respective mechanisms (X-axis movement means 22, Y-axis movement means 27, Z-axis movement means 15) that drive the processing apparatus 1. The control section 42 controls the respective parts of the processing apparatus 1 and implements processing treatment by the processing apparatus 1. The control section 42 controls the respective parts of the processing apparatus 1 including the holding table 10 and the processing unit 20 and implements processing treatment of the workpiece 100 in accordance with a processing condition input and set by an operator, for example.

The control section 42 includes a calculation processing device such as a central processing unit (CPU), a storing device such as a read only memory (ROM) or random access memory (RAM), and an input-output interface device. The control section 42 is a computer that can execute a control program for controlling the above-described respective constituent elements, and so forth, with use of these devices in accordance with a series of processing steps executed by the processing apparatus 1.

The control section 42 controls overall operation of the processing apparatus 1 on the basis of the processing condition data 500 stored in the processing condition storing section 411. The control section 42 controls operation of the processing apparatus 1 by executing functions of the processing condition indicated by the processing condition data 500. The control section 42 controls operation of the processing apparatus 1 from processing preparation to the processing end by sequentially executing plural functions based on the processing condition.

The control section 42 includes functions of a display control section 421 and a change section 422. The control section 42 implements functions, operation, and so forth of the respective parts by executing a program.

The display control section 421 causes the display section 31 to display a processing condition screen relating to the processing condition data 500. For example, the processing condition screen is a screen that allows identification of functions to be executed in plural functions that are executable by the processing apparatus 1. The display control section 421 controls the display section 31 to display, on the processing condition screen, function objects that allow identification of functions to be executed based on the processing condition data 500 by the processing apparatus 1. The display control section 421 causes the processing condition screen to display the function objects of the functions to be executed based on the processing condition data 500 by the processing apparatus 1 and second function objects of functions that are not to be executed in different display forms. The function objects and the second function objects displayed on the processing condition screen include, for example, buttons with which selection operation by an operator or the like is possible and display regions, figures, character strings, and so forth in the processing condition screen. The display control section 421 has a function of creating data of the processing condition screen that displays the function objects on the basis of the setting contents of the processing condition data 500. The display control section 421 has a function of causing the display section 31 to display an order change screen with which the order of a function to be executed and a function that is not to be executed can be changed. The order change screen is a screen relating to the processing condition data 500 similarly to the processing condition screen. For example, the order change screen is a screen that allows change based on the function objects displayed by the processing condition screen. That is, in the order change screen, the configuration that allows identification of the order of a function to be executed and a function that is not to be executed is the same as the processing condition screen. Thus, the order change screen is included in the processing condition screen.

When the second function object of a function that is not to be executed is moved to a position adjacent to the function object of a function to be executed in the order change screen (processing condition screen), the change section 422 changes the function that is not to be executed to a function to be executed. The change section 422 changes a function that is not to be executed by the processing apparatus 1 to a function to be executed according to operation by the operator. For example, when the second function object of a function that is not to be executed is moved to between function objects adjacent to each other, the change section 422 may change the function that is not to be executed to a function to be executed. When changing the function that is not to be executed to the function to be executed, the change section 422 changes the processing condition of the processing condition data 500 corresponding to the changed function. The change section 422 refers to change data, database, and so forth corresponding to the processing condition of the change target and changes the processing condition to cause the processing apparatus 1 to execute the function. For example, the change section 422 makes the change in such a manner that setting of the processing condition under which the processing apparatus 1 executes the function becomes valid.

The configuration example of the processing apparatus 1 according to the present embodiment has been described above. The above-described configuration described with use of FIG. 1 and FIG. 2 is just one example and the configuration of the processing apparatus 1 according to the present embodiment is not limited to this example. The functional configuration of the processing apparatus 1 according to the present embodiment can be flexibly modified according to specifications and operation.

One Example of Processing Condition Screen

Figure 3:
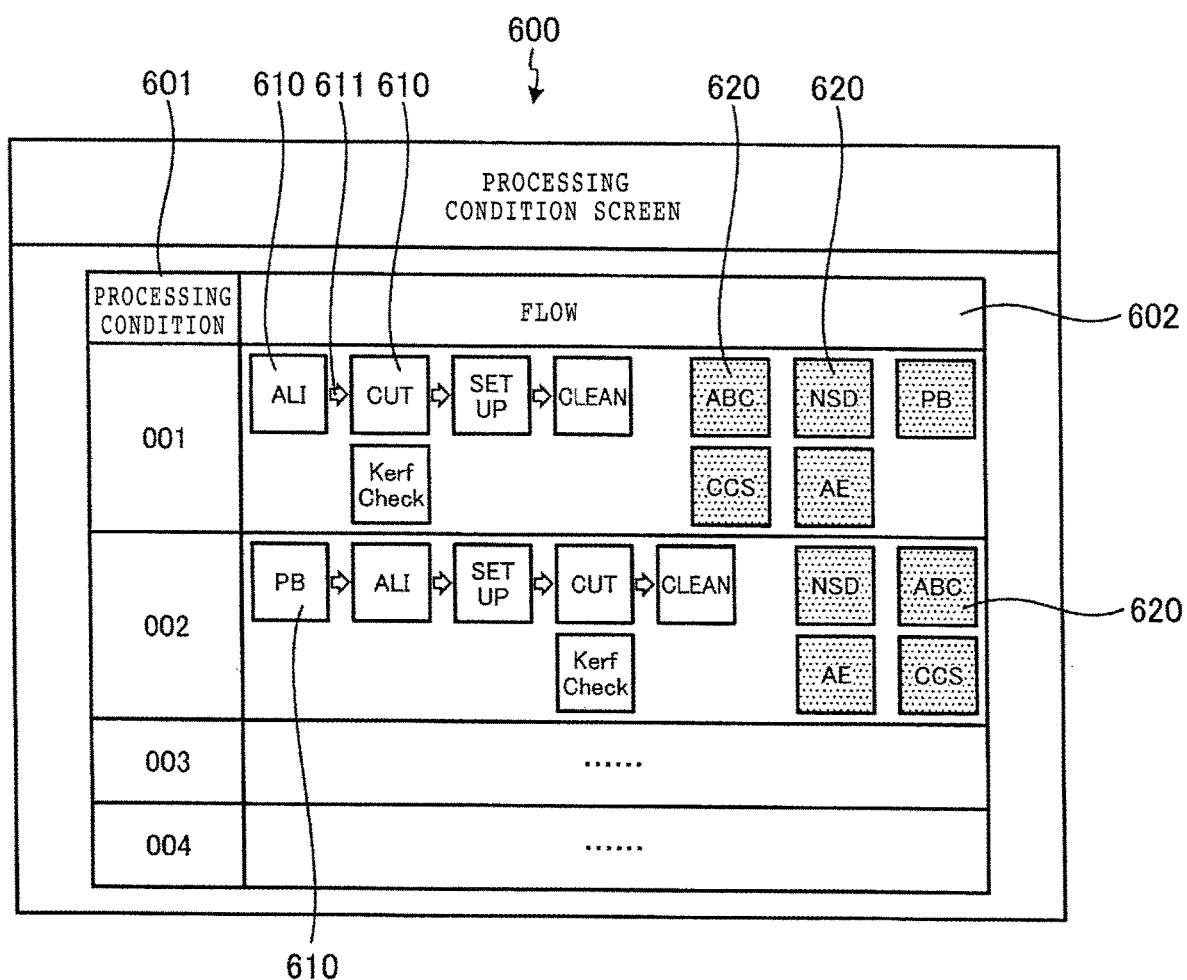
FIG. 3 is a diagram illustrating one example of a processing condition screen displayed by the processing apparatus according to the embodiment.

FIG. 3 is a diagram illustrating one example of the processing condition screen displayed by the processing apparatus 1 according to the embodiment. As illustrated in FIG. 3, a processing condition screen 600 has a processing condition region 601 and a flow region 602. In the processing condition region 601, information that allows identification of the processing condition is displayed. In the flow region 602, information that indicates function objects 610 and arrow objects 611 is displayed. The function object 610 is information that indicates a function to be executed by the processing apparatus 1. The function object 610 is displayed when a processing condition under which the processing apparatus 1 executes the relevant function is set in the processing condition data 500. The arrow object 611 is information that indicates the function object 610 next to the function object 610. The arrow object 611 is displayed between the function objects 610 adjacent to each other. The processing condition screen 600 can cause the processing condition to be easily grasped by displaying plural processing conditions and flows by the function objects 610.

In the present embodiment, in the flow region 602, information that indicates second function objects 620 is further displayed. The second function object 620 is information that indicates a function that is not to be executed by the processing apparatus 1 in the processing condition data 500. The second function object 620 is displayed when a processing condition under which the processing apparatus 1 does not execute the relevant function is set in the processing condition data 500.

In the one example illustrated in FIG. 3, the function objects 610 and the second function objects 620 indicate functions that are executable by the processing apparatus 1 under the processing condition, such as ALI, SET UP, CUT, ABC, NSD, PB, CLEAN, CCS, AE, and Kerf Check, for example. ALI is alignment, a function in which the processing apparatus 1 images the workpiece 100 held by the holding table 10 and detects a planned dividing line. SET UP is a function in which the processing apparatus 1 inserts a cutting blade between a light projecting part having a light emitting element and a light receiving part having a light receiving element and measures the amount of wear of the cutting blade on the basis of change in the amount of light received by the light receiving element. CUT is a function in which the processing apparatus 1 executes cutting processing. ABC is auto blade changer, a function relating to an attaching-detaching arm that attaches and detaches a blade and a conveying unit that conveys the blade. NSD is a function of measuring, by a back pressure sensor, the thickness of the workpiece 100 held by the holding table 10 and is a function used in the case of precise cutting processing in which plural points are measured before processing and the amount of cutting into the workpiece 100 is decided based on the measurement result. PB is precutting, a function of cutting a precut board to execute dressing of a blade before cutting a workpiece. CLEAN is a function of cleaning the workpiece 100 after processing or cleaning the workpiece 100 before processing. CCS is a function of imaging a cutting mark formed through cutting into a dummy wafer and accurately measuring the outer diameter of a blade of the processing apparatus 1 from an image obtained by the imaging. AE is a function of measuring vibrations by an AE sensor mounted on a mount that fixes a cutting blade of the processing apparatus 1 to a spindle. Kerf Check is a function of imaging a cut groove of the workpiece 100 and checking the quality and a position thereof.

In the one example illustrated in FIG. 3, the processing condition screen 600 displays information based on the processing condition data 500 corresponding to each of "001," "002," "003," and "004" displayed in the processing condition region 601. For example, the processing condition screen 600 displays the information relating to the processing condition data 500 in the order of use of the processing condition by the processing apparatus 1, the order of creation of the processing condition, order specified by the operator, or the like.

In the case of the processing condition of "001" in the processing condition region 601, the processing condition screen 600 indicates, by the flow region 602, that functions of "ALI," "CUT," "Kerf Check," "SET UP," "CLEAN," "ABC," "NSD," "PB," "CCS," and "AE" are executable by the processing apparatus 1. In this case, the processing condition screen 600 displays, in the flow region 602, the function objects 610 of "ALI," "CUT," "Kerf Check," "SET UP," and "CLEAN," the arrow objects 611 that indicate the order of the function objects 610, and the second function objects 620 of "ABC," "NSD," "PB," "CCS," and "AE." The processing condition screen 600 displays the function objects 610 in a first display form and displays the second function objects 620 in a second display form different from the first display form. The processing condition screen 600 displays the function objects 610 and the second function objects 620 in the flow region 602 in such a manner as to divide them into different display regions.

The processing apparatus 1 can cause the operator to recognize that, when the processing condition is "001," the functions of "ALI," "CUT," "Kerf Check," "SET UP," and "CLEAN" are set to be executed based on the processing condition data 500, that the processing apparatus 1 executes the functions in order of "ALI," "CUT," "Kerf Check," "SET UP," and "CLEAN," and so forth. The processing apparatus 1 can cause the operator to recognize that the processing condition of "001" is a processing condition under which the processing apparatus 1 does not execute the functions of "ABC," "NSD," "PB," "CCS," and "AE" in the functions that are executable in the processing apparatus 1.

Similarly, in the case of the processing condition of "002" in the processing condition region 601, the processing condition screen 600 indicates, by the flow region 602, that functions of "PB," "ALI," "SET UP," "CUT," "Kerf Check," "CLEAN," "NSD," "ABC," "AE," and "CCS" are executable. In this case, the processing condition screen 600 displays, in the flow region 602, the function objects 610 of "PB," "ALI," "SET UP," "CUT," "Kerf Check," and "CLEAN," the arrow objects 611 that indicate the order of the function objects 610, and the second function objects 620 of "NSD," "ABC," "AE," and "CCS." The processing condition screen 600 displays the function objects 610 in the first display form and displays the second function objects 620 in the second display form. The processing condition screen 600 displays the function objects 610 and the second function objects 620 in the flow region 602 in such a manner as to divide them into different display regions. In the one example illustrated in FIG. 3, diagrammatic representation about "003" and "004" of the processing condition region 601 is omitted in the processing condition screen 600.

Although description has been made about the case in which the processing condition screen 600 displays the function objects 610, the arrow objects 611, and the second function objects 620 in the flow region 602 in the present embodiment, the configuration is not limited thereto. For example, a configuration in which the processing condition screen 600 displays the function objects 610 and the arrow objects 611 without displaying the second function objects 620 may be employed. For example, the processing condition screen 600 may represent the order of execution of the function by the processing apparatus 1 by order in which the function objects 610 are lined up without displaying the arrow objects 611. For example, the processing condition screen 600 may display the function objects 610 and the second function objects 620 in such a manner as to line up them in order in which the processing apparatus 1 can execute the functions.

One Example of Processing Condition Data

Figure 4:
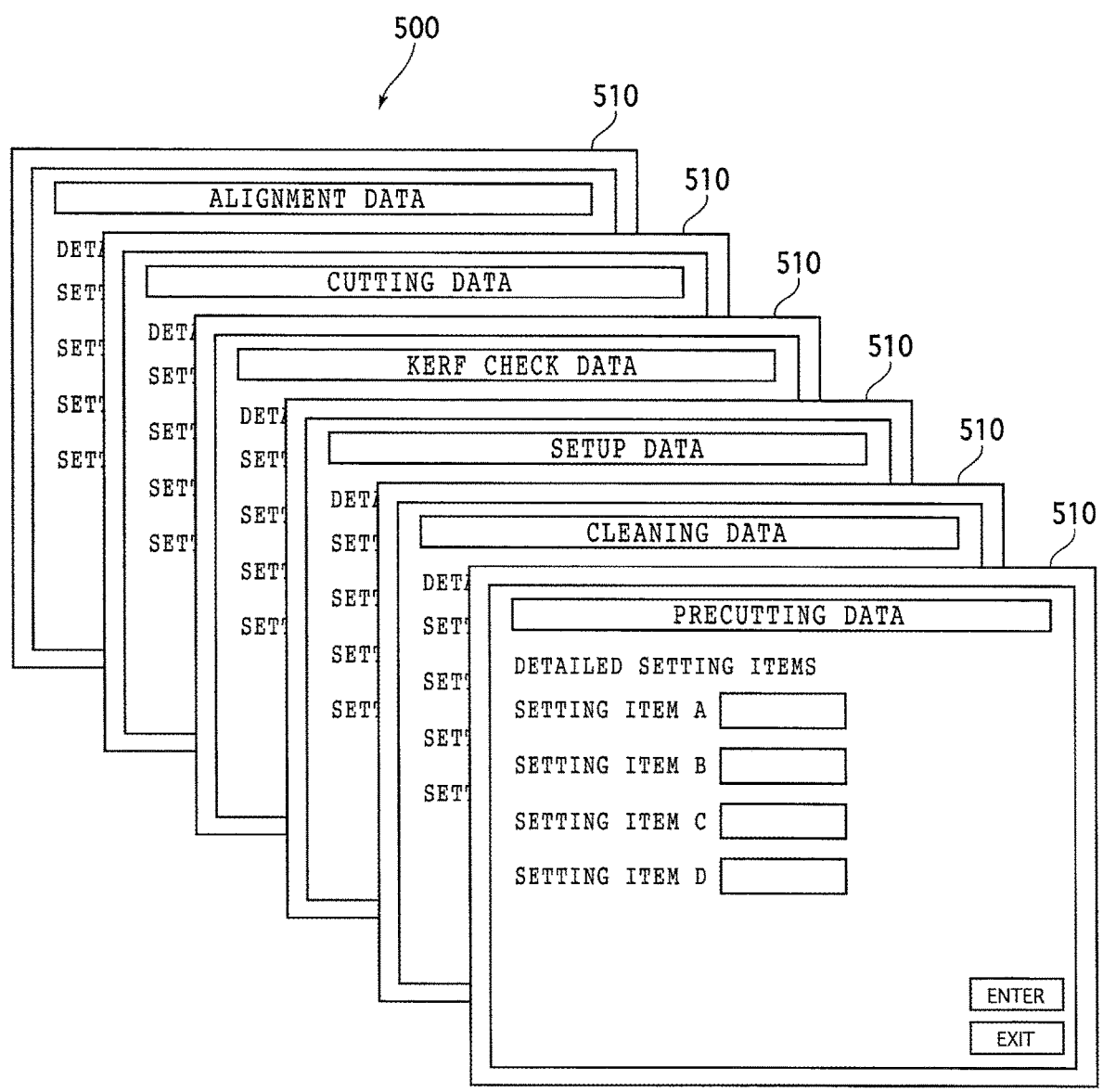
FIG. 4 is a diagram illustrating one example of processing condition data used by the processing apparatus according to the embodiment.

FIG. 4 is a diagram illustrating one example of the processing condition data 500 used by the processing apparatus 1 according to the embodiment. As illustrated in FIG. 4, the processing condition data 500 has plural pieces of detailed condition data 510. The detailed condition data 510 is data that indicates a detailed condition of one function in plural functions corresponding to the processing condition. The detailed condition data 510 has plural setting items and setting fields corresponding to the setting items, for example. The plural pieces of the detailed condition data 510 may be lined up in the order of execution of the function or may be lined up irrespective of the order of execution of the function.

In the one example illustrated in FIG. 4, the processing condition data 500 indicates a processing condition under which functions of the above-described "ALI," "CUT," "Kerf Check," "SET UP," "CLEAN," and "PB" are executable. In this case, the processing condition data 500 has the pieces of detailed condition data 510 in order of alignment data, cutting data, kerf check data, setup data, cleaning data, precutting data, or the like. Suppose that, in the processing condition data 500, for example, the pieces of detailed condition data 510 are set in such a manner that the functions of the alignment data, the cutting data, the kerf check data, the setup data, and the cleaning data become valid and the function of the precutting data becomes invalid. In this case, based on the processing condition data 500, the processing apparatus 1 causes the processing condition screen 600 to display the function objects 610 of "ALI," "CUT," "Kerf Check," "SET UP," and "CLEAN," the arrow objects 611, and the second function object 620 of "PB."

Although the case in which the processing condition data 500 has the plural pieces of the detailed condition data 510 has been described in the present embodiment, the configuration is not limited thereto. For example, a configuration in which the processing condition data 500 has the plural pieces of the detailed condition data 510 as one piece of data may be employed.

Display Control Example of Processing Condition Screen in Processing Apparatus

Figure 5:
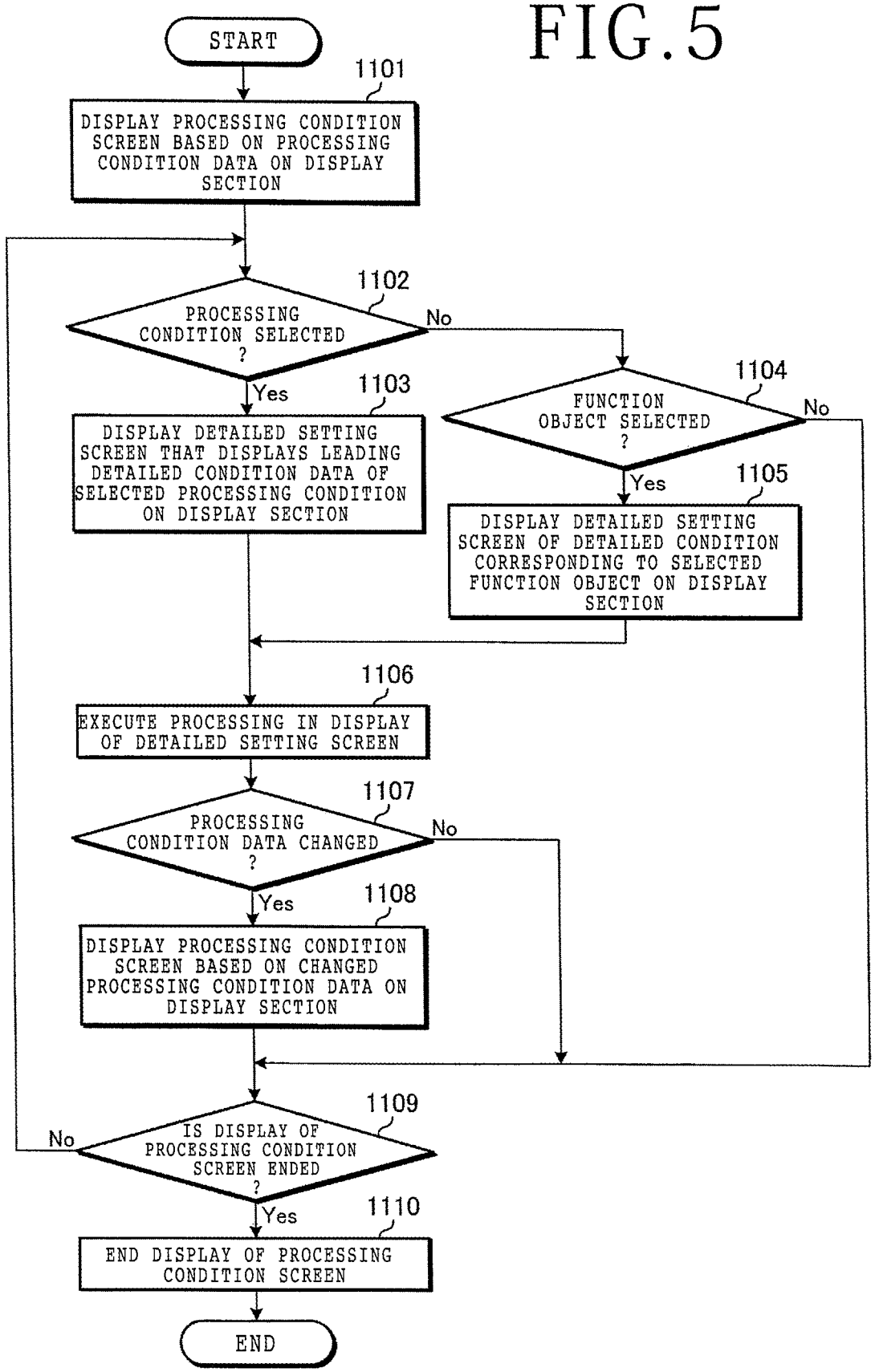
FIG. 5 is a flowchart illustrating one example of a processing procedure relating to display control of the processing apparatus according to the embodiment.

Next, one example of display control of the processing condition screen 600 executed by the processing apparatus 1 according to the embodiment will be described. FIG. 5 is a flowchart illustrating one example of a processing procedure relating to the display control of the processing apparatus 1 according to the embodiment. FIG. 6 is a diagram illustrating one example of a detailed setting screen 700 of the processing apparatus 1 according to the embodiment. The processing procedure illustrated in FIG. 5 is implemented through execution of a program by the control section 42 of the processing apparatus 1. The processing procedure illustrated in FIG. 5 is executed by the control section 42, for example, in the case of displaying the processing condition screen 600, or the like.

In the processing procedure illustrated in FIG. 5, the control section 42 of the processing apparatus 1 causes the display section 31 to display the processing condition screen 600 based on the processing condition data 500 (step 1101). For example, the control section 42 acquires the processing condition data 500 in the storing section 41 and creates screen data that causes the processing condition screen 600 to display the function objects 610, the arrow objects 611, the second function objects 620, and so forth based on the processing condition data 500. Then, the control section 42 causes the display section 31 to display the created screen data. This makes the display section 31 become the state in which the display section 31 displays the processing condition screen 600 based on the processing condition data 500. When the processing of the step 1101 ends, the control section 42 advances the processing to a step 1102.

The control section 42 determines whether or not the processing condition has been selected (step 1102). For example, the control section 42 determines that the processing condition has been selected when detecting selection operation to the processing condition region 601 in the processing condition screen 600 through the input section 32. When determining that the processing condition has been selected (Yes in the step 1102), the control section 42 advances the processing to a step 1103.

The control section 42 causes the display section 31 to display the detailed setting screen 700 that indicates the leading detailed condition of the selected processing condition (step 1103). For example, the control section 42 acquires the leading detailed condition data 510 of the processing condition data 500 and creates screen data for displaying the detailed setting screen 700 based on the detailed condition data 510. Then, the control section 42 causes the display section 31 to display the screen data. This makes the display section 31 become the state in which the display section 31 displays the detailed setting screen 700 based on the detailed condition data 510.

For example, as illustrated in FIG. 6, the detailed setting screen 700 is a screen with which it is possible to check and change the setting of the detailed condition corresponding to a function of the processing condition. The detailed setting screen 700 has entry fields corresponding to setting items of the detailed condition. The detailed setting screen 700 has an ENTER button 711 and an EXIT button 712. The ENTER button 711 is a button to register data set in the detailed setting screen 700. The EXIT button 712 is a button to end the display without registering the contents of change in the detailed setting screen 700. The detailed setting screen 700 can allow the operator to change the displayed detailed condition.

Referring back to FIG. 5, when the processing of the step 1103 ends, the control section 42 advances the processing to a step 1106 to be described later.

Furthermore, when determining that the processing condition has not been selected (No in the step 1102), the control section 42 advances the processing to a step 1104. The control section 42 determines whether or not the function object 610 has been selected (step 1104). For example, the control section 42 determines that the function object 610 has been selected when detecting selection operation to the function object 610 in the processing condition screen 600 through the input section 32. When determining that the function object 610 has not been selected (No in the step 1104), the control section 42 advances the processing to a step 1109 to be described later.

Furthermore, when determining that the function object 610 has been selected (Yes in the step S1104), the control section 42 advances the processing to a step 1105. The control section 42 causes the display section 31 to display the detailed setting screen 700 that indicates the detailed condition corresponding to the selected function object 610 (step 1105). For example, the control section 42 acquires the detailed condition data 510 corresponding to the selected function object 610 from plural pieces of the detailed condition data 510 of the processing condition data 500. Then, the control section 42 creates screen data for displaying the detailed setting screen 700 based on the detailed condition data 510 and causes the display section 31 to display the screen data. This makes the display section 31 become the state in which the display section 31 displays the detailed setting screen 700 based on the detailed condition data 510 corresponding to the function object 610. When the processing of the step 1105 ends, the control section 42 advances the processing to the step 1106.

The control section 42 executes processing in the display of the detailed setting screen 700 (step 1106). For example, the processing in the display includes processing of accepting change operation to the processing condition screen 600, processing of updating the display of the display section 31 to the changed processing condition screen 600, processing of changing the detailed condition data 510 and ending the display in response to operation of the ENTER button 711, processing of ending the display without changing the detailed condition data 510 in response to operation of the EXIT button 712, and so forth. When the processing in the display ends, the control section 42 advances the processing to a step 1107.

The control section 42 determines whether or not the processing condition data 500 has been changed (step 1107). For example, when detecting change in the detailed condition data 510 to a function to be executed or a function that is not to be executed, the control section 42 determines that the processing condition data 500 having the detailed condition data 510 has been changed. When determining that the processing condition data 500 has not been changed (No in the step 1107), the control section 42 advances the processing to the step 1109 to be described later.

Furthermore, when determining that the processing condition data 500 has been changed (Yes in the step 1107), the control section 42 advances the processing to a step 1108. The control section 42 causes the display section 31 to display the processing condition screen 600 based on the changed processing condition data 500 (step 1108). For example, the control section 42 creates screen data that causes the processing condition screen 600 to display the function objects 610, the arrow objects 611, the second function objects 620, and so forth based on the changed processing condition data 500. Then, the control section 42 causes the display section 31 to display the created screen data. This makes the display section 31 become the state in which the display section 31 displays the processing condition screen 600 based on the changed processing condition data 500. When the processing of the step 1108 ends, the control section 42 advances the processing to the step 1109.

The control section 42 determines whether or not to end the display of the processing condition screen 600 (step 1109). For example, the control section 42 determines to end the display of the processing condition screen 600 when detecting end operation of the display through the input section 32 or accepting an end instruction of the display. When determining not to end the display of the processing condition screen 600 (No in the step 1109), the control section 42 returns the processing to the already-described step 1102 to continue the processing. Furthermore, when determining to end the display of the processing condition screen 600 (Yes in the step 1109), the control section 42 advances the processing to a step 1110.

The control section 42 ends the display of the processing condition screen 600 (step 1110). For example, the control section 42 controls the display section 31 to end the display of the processing condition screen 600 displayed by the display section 31. When the processing of the step 1110 ends, the control section 42 ends the processing procedure illustrated in FIG. 5.

As described above, the processing apparatus 1 can display, on the processing condition screen 600, the function objects 610 that allow identification of functions to be executed based on the processing condition data 500. Due to this, the processing apparatus 1 can allow recognition of the function objects 610 of the functions to be executed. Therefore, it is possible to suppress the occurrence of the situation in which the operator attempts to set a function that the processing apparatus 1 does not have and searches for the processing condition when setting the processing condition and the situation in which the operator forgets to set the function that should be executed. As a result, the processing apparatus 1 can allow efficient check and setting of the functions to be executed based on the processing condition in the plural functions that are executable by the processing apparatus 1 by displaying the processing condition screen 600.

Furthermore, the processing apparatus 1 can display, on the processing condition screen 600, the function objects 610 of functions to be executed based on the processing condition data 500 and the second function objects 620 of functions that are not to be executed in different display forms. This allows the processing apparatus 1 to display the functions to be executed under the processing condition and the functions that are not to be executed in such a manner that they can be identified in the processing condition screen 600. As a result, the processing apparatus 1 can allow intuitive check of whether the functions desired to be executed are valid and whether the functions desired not to be executed are invalid by displaying the processing condition screen 600.

Moreover, the processing apparatus 1 can cause the processing condition screen 600 to display the function objects 610 that represent functions to be executed based on the processing condition data 500 in such a manner that the function objects 610 are lined up in the order of execution. Due to this, the processing apparatus 1 can cause the operator to recognize the order in which the function objects 610 are displayed in the processing condition screen 600 as the order of execution of the function by the processing apparatus 1. As a result, the processing apparatus 1 can allow the operator to easily check whether the functions are executed in the intended order through referring to the order in which the function objects 610 are displayed.

Example of Function Order Change in Processing Apparatus

Figure 7:
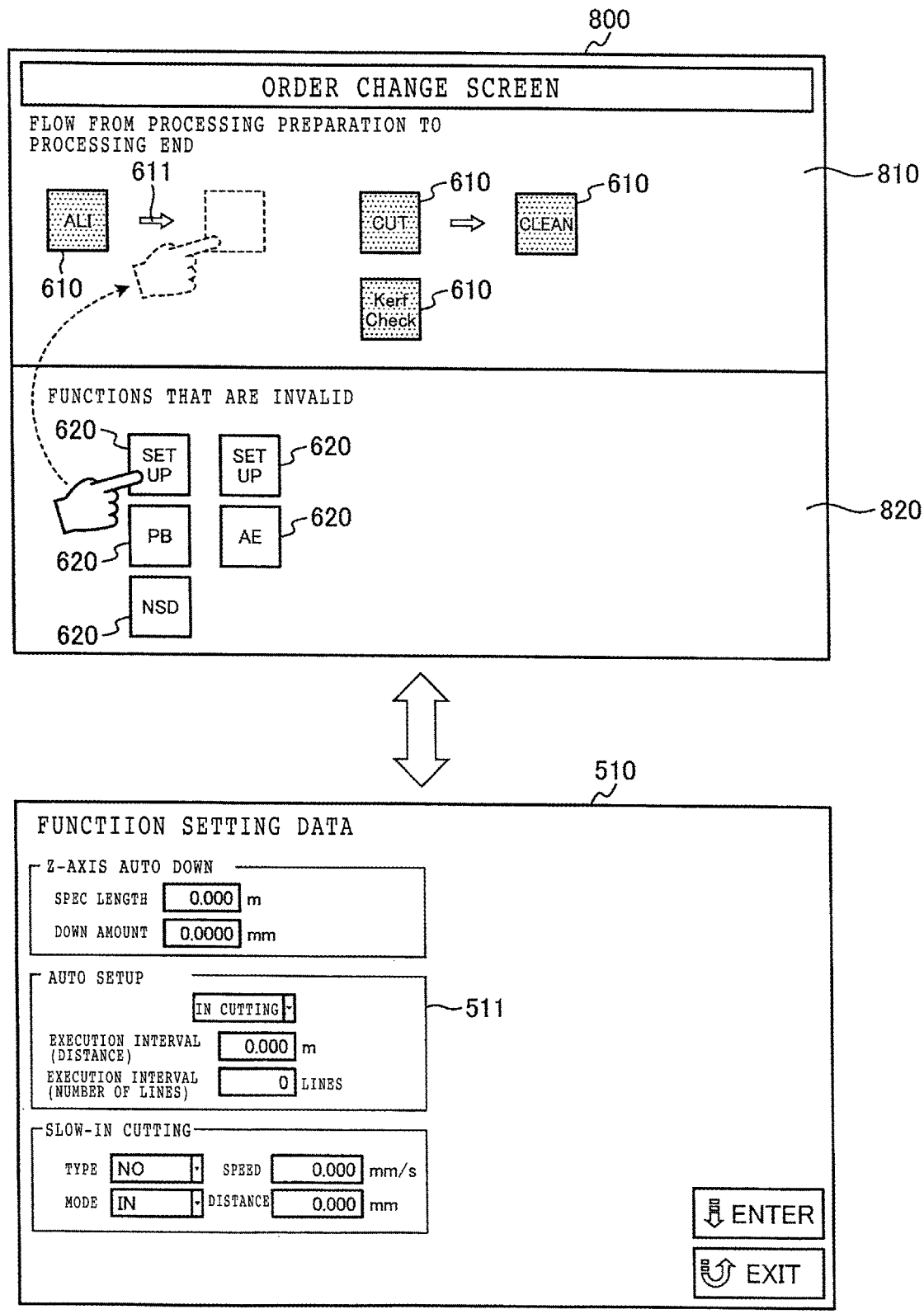
FIG. 7 is a diagram for explaining order change of the processing apparatus according to the embodiment.
Figure 8:
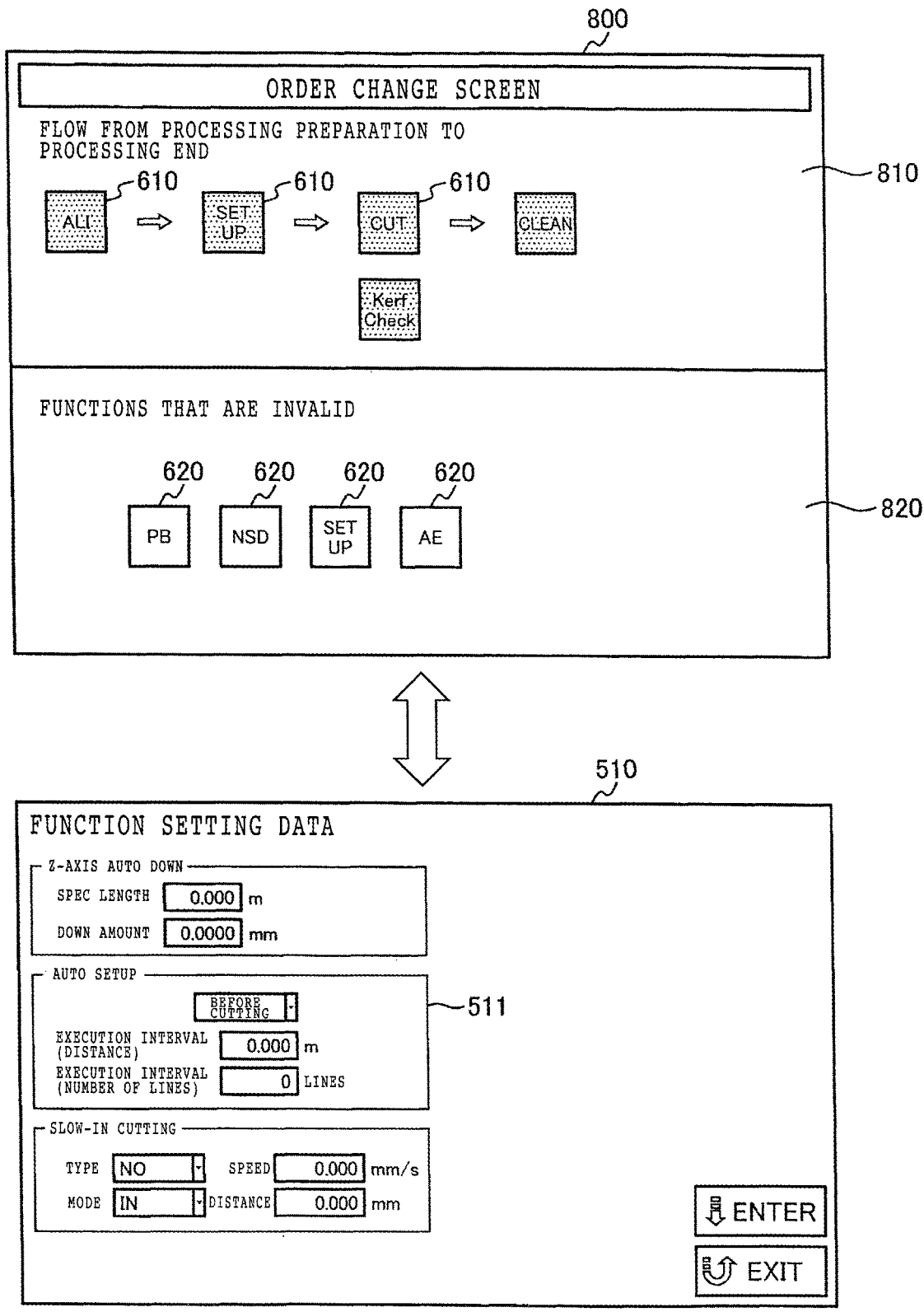
FIG. 8 is a diagram for explaining a sequel to the order change illustrated in FIG. 7.

Next, one example of order change of the processing condition executed by the processing apparatus 1 according to the embodiment will be described. FIG. 7 is a diagram for explaining order change of the processing apparatus 1 according to the embodiment. FIG. 8 is a diagram for explaining a sequel to the order change illustrated in FIG. 7.

As illustrated in the upper diagram of FIG. 7, the processing apparatus 1 causes the display section 31 to display an order change screen 800 with which the order of functions of a processing condition can be changed. The processing apparatus 1 causes the display section 31 to display the order change screen 800 in response to an instruction from the operator, for example. The order change screen 800 has a first display region 810 and a second display region 820. The first display region 810 is a region that indicates the flow of functions to be executed from processing preparation to the processing end, for example. The first display region 810 is a region that displays the function objects 610 of functions to be executed by the processing apparatus 1 and the arrow objects 611 in such a manner that they are movable. The second display region 820 is a region that indicates functions that are invalid. The second display region 820 is a region that displays the second function objects 620 indicating functions that are not to be executed by the processing apparatus 1 under the processing condition. The order change screen 800 is a screen with which the function flow displayed by the processing condition screen 600 can be changed.

In the one example illustrated in the upper diagram of FIG. 7, the processing apparatus 1 lines up and displays the function objects 610 in the first display region 810 in order of "ALI," "CUT," "Kerf Check," and "CLEAN" as the flow of the functions to be executed from processing preparation to the processing end on the basis of the processing condition data 500 of the change target. The processing apparatus 1 displays, in the second display region 820, the second function objects 620 of two pieces of "SET UP," "PB," "NSD," and "AE" as functions that are invalid on the basis of the processing condition data 500 of the change target. The function of "SET UP" is a function that can be executed at any timing such as before processing, in processing, or after processing, for example. Thus, the processing apparatus 1 displays the second function objects 620 in the second display region 820 in a quantity according to the number of timings at which the relevant functions can be executed in the flow on the basis of the detailed condition data 510. By displaying plural second function objects 620 of the functions that are invalid, the processing apparatus 1 can cause the operator to recognize that plural functions in these functions can be added to the flow.

The detailed condition data 510 illustrated in the lower diagram of FIG. 7 illustrates the detailed condition of the second function object 620 of "SET UP." The detailed condition data 510 has a setting item 511 of auto setup. In the setting item 511 of auto setup, setting that causes setup to be automatically executed in cutting is made. However, the execution interval is "0.000" and therefore the function of auto setup is invalid.

In the upper diagram of FIG. 7, in order to cause a function of setup that is invalid to become valid, the operator moves the second function object 620 of "SET UP" to between the function object 610 of "ALI" and the function object 610 of "CUT" in the first display region 810. For example, the operator executes operation of drag-and-drop for the object of the change target.

The processing apparatus 1 detects the operation of moving the second function object 620 of "SET UP" to the first display region 810 through the input section 32. As illustrated in the upper diagram of FIG. 8, the processing apparatus 1 changes the display of the order change screen 800 in such a manner that the second function object 620 of "SET UP" is disposed between the function object 610 of "ALI" and the function object 610 of "CUT" in the first display region 810 and is deleted from the second display region 820. For example, the detailed condition data 510 has change data such as the timing at which the function can be executed or the change data is associated with the detailed condition data 510. The change data has data of method, setting, and so forth for changing the detailed condition from the valid state to the invalid state, for example. When the second function object 620 is moved to a position at which addition is possible in the flow, the processing apparatus 1 executes processing for changing the invalid function to the valid function on the basis of the detailed condition data 510.

The processing apparatus 1 changes the detailed condition data 510 corresponding to the function of setup to make the function of setup valid. For example, the processing apparatus 1 makes the function of setup valid by changing the timing at which auto setup is executed to "before cutting" in the setting item 511 of auto setup in the detailed condition data 510 as illustrated in the lower diagram of FIG. 8.

Through the above, the processing apparatus 1 can allow the operator to check the flow of the functions to be executed from before processing to the processing end by the order change screen 800 and can add a function that is not to be executed to this flow. As a result, when a function desired to be used is invalid, the processing apparatus 1 can cause this function to be easily made valid through simple operation.

When detecting predetermined operation to the function object 610 or the second function object 620, the processing apparatus 1 may display a screen that displays the detailed condition data 510 of the corresponding function on the display section 31. The processing apparatus 1 may allow the operator to check the detailed condition of the function and, when the detailed condition is corrected to cause the function to become valid, may change the function from an invalid function to a valid function and change the contents of display of the order change screen 800.

Although description has been made about the case in which the processing apparatus 1 adds an invalid function to the flow to make the function valid in the order change screen 800 in the present embodiment, the configuration is not limited thereto. For example, when the function object 610 of a valid function displayed in the first display region 810 is moved to the second display region 820 in the order change screen 800, the processing apparatus 1 can change this function from the valid function to an invalid function. In this case, the processing apparatus 1 changes the detailed condition data to cause the function to become invalid. Furthermore, a configuration may be employed in which the processing apparatus 1 replaces the order change screen 800 by the above-described processing condition screen 600 and adds an invalid function to the flow to make the function valid in the processing condition screen 600.

Display Control Example of Order Change Screen in Processing Apparatus

Figure 9:
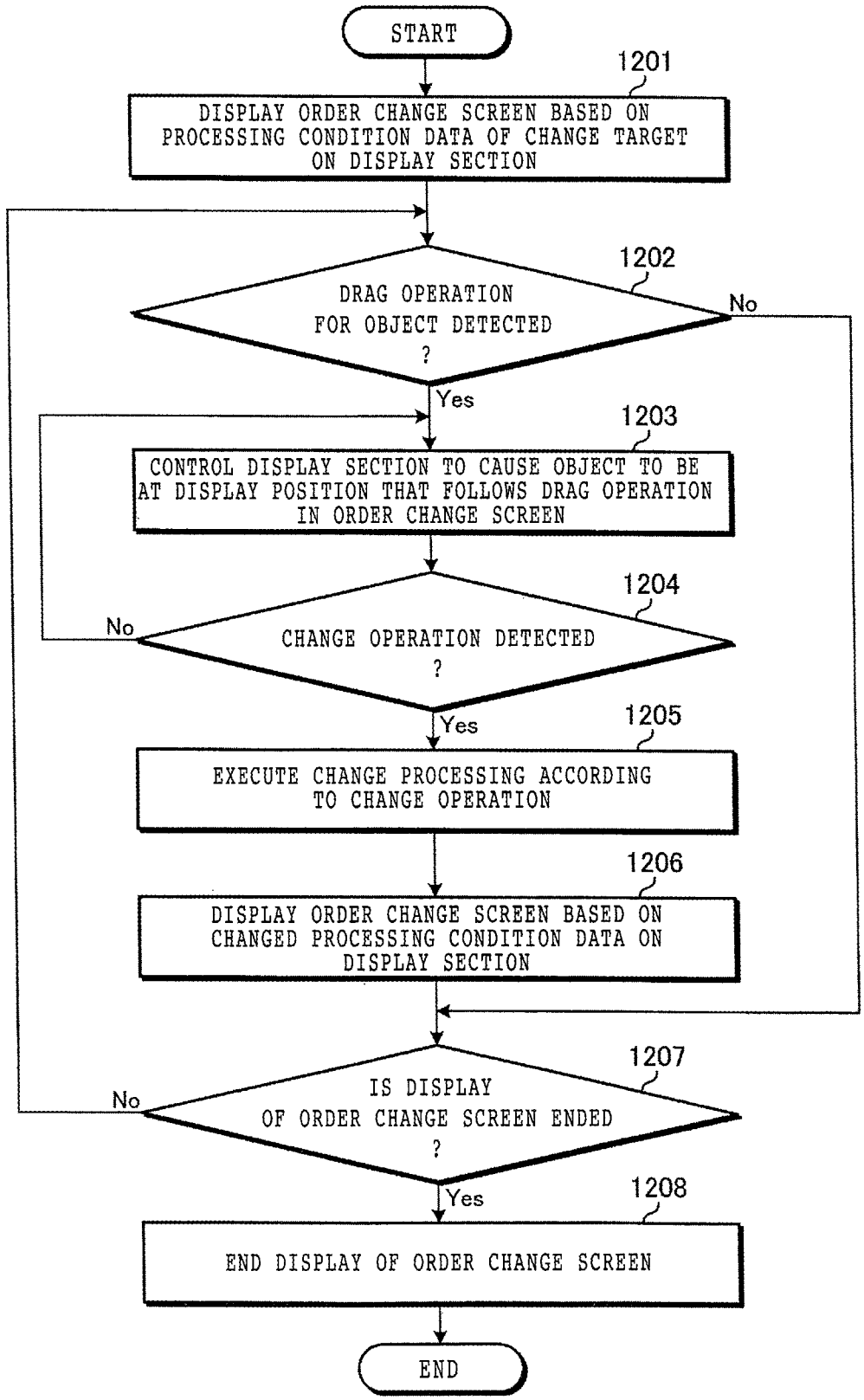
FIG. 9 is a flowchart illustrating one example of a processing procedure relating to display control of an order change screen of the processing apparatus according to the embodiment.

Next, one example of display control of the order change screen 800 executed by the processing apparatus 1 according to the embodiment will be described. FIG. 9 is a flowchart illustrating one example of a processing procedure relating to the display control of the order change screen 800 of the processing apparatus 1 according to the embodiment. The processing procedure illustrated in FIG. 9 is implemented through execution of a program by the control section 42 of the processing apparatus 1. The processing procedure illustrated in FIG. 9 is executed by the control section 42, for example, in the case of displaying the order change screen 800, or the like.

In the processing procedure illustrated in FIG. 9, the control section 42 of the processing apparatus 1 causes the display section 31 to display the order change screen 800 based on the processing condition data 500 (step 1201). For example, the control section 42 acquires the processing condition data 500 ordered by an operator from the storing section 41 and creates screen data that causes the order change screen 800 to display the function objects 610, the arrow objects 611, the second function objects 620, and so forth based on the processing condition data 500. The screen data is data to display the function objects 610 and the arrow objects 611 in the first display region 810 and display the second function objects 620 in the second display region 820. Then, the control section 42 causes the display section 31 to display the created screen data. This makes the display section 31 become the state in which the display section 31 displays the order change screen 800 based on the processing condition data 500. When the processing of the step 1201 ends, the control section 42 advances the processing to a step 1202.

The control section 42 determines whether or not drag operation for an object is detected (step 1202). For example, the control section 42 determines that drag operation for an object is detected when detecting drag operation for the second function object 620 or the function object 610 in the order change screen 800 through the input section 32. The control section 42 advances the processing to a step 1207 to be described later when determining that drag operation for an object is not detected (No in the step 1202). Furthermore, the control section 42 advances the processing to a step 1203 when determining that drag operation for an object is detected (Yes in the step 1202).

The control section 42 controls the display section 31 to cause the object to be at the position that follows the drag operation in the order change screen 800 (step 1203). For example, the control section 42 changes the display of the order change screen 800 to cause the object of the target to be located at the position of the contact thing detected through the input section 32. When the processing of the step 1203 ends, the control section 42 advances the processing to a step 1204.

The control section 42 determines whether or not change operation has been detected (step 1204). For example, the control section 42 determines that change operation has been detected when detecting change operation for the second function object 620 or change operation for the function object 610 or the like in the order change screen 800 through the input section 32. For example, the change operation includes operation of drag-and-drop or the like for the object of the change target for changing validity or invalidity of the function. When determining that change operation has not been detected (No in the step 1204), the control section 42 returns the processing to the already-described step 1203 to continue the processing. Furthermore, when determining that change operation has been detected (Yes in the step 1204), the control section 42 advances the processing to a step 1205.

The control section 42 executes change processing according to the change operation (step 1205). For example, the change processing includes processing of changing the display position in the order change screen 800 regarding the object of the change target, processing of changing the detailed condition data 510 of the function corresponding to the object of the change target, processing of changing the processing condition data 500 on the basis of the changed detailed condition data, and so forth. When the change processing of the step 1205 ends, the control section 42 advances the processing to a step 1206.

The control section 42 causes the display section 31 to display the order change screen 800 based on the changed processing condition data 500 (step 1206). For example, the control section 42 creates screen data that causes the order change screen 800 to display the function objects 610, the arrow objects 611, the second function objects 620, and so forth based on the changed processing condition data 500. Then, the control section 42 causes the display section 31 to display the created screen data. This makes the display section 31 become the state in which the display section 31 displays the order change screen 800 based on the processing condition data 500 after the change. When the processing of the step 1206 ends, the control section 42 advances the processing to the step 1207.

The control section 42 determines whether or not to end the display of the order change screen 800 (step 1207). For example, the control section 42 determines to end the display of the order change screen 800 when detecting end operation of the display through the input section 32 or accepting an end instruction of the display. When determining not to end the display of the order change screen 800 (No in the step 1207), the control section 42 returns the processing to the already-described step 1202 to continue the processing. Furthermore, when determining to end the display of the order change screen 800 (Yes in the step 1207), the control section 42 advances the processing to a step 1208.

The control section 42 ends the display of the order change screen 800 (step 1208). For example, the control section 42 controls the display section 31 to end the display of the order change screen 800 displayed by the display section 31. When the processing of the step 1208 ends, the control section 42 ends the processing procedure illustrated in FIG. 9.

OTHER EMBODIMENTS

The processing apparatus 1 according to the present embodiment is not limited to the above-described embodiment and can be carried out with various modifications without departing from the gist of the present invention. For example, the processing apparatus 1 may be a grinding apparatus or a laser processing apparatus as apparatus other than cutting apparatus.

For example, when the processing apparatus is laser processing apparatus, the processing apparatus can execute functions of output power check, spot shape check, and so forth at any timing such as before processing, in processing, and after processing. The function of output power check is a function of irradiating an output power measuring instrument that is a setup unit of the laser processing apparatus with a laser beam and checking whether the output power is a predetermined value. The function of spot shape check is a function of determining whether or not the spot shape is correct through setting a dummy plate-shaped object on a second holding table adjacent to a holding table and executing laser irradiation to form the spot shape and imaging the spot to compare it with a reference spot shape.

Furthermore, the respective constituent elements of the processing apparatus 1 explained in the above-described embodiment are functionally conceptual ones and do not necessarily need to be configured as illustrated in the diagrams physically. That is, specific forms of dispersion and integration of the processing apparatus 1 are not limited to what are illustrated in the diagrams and the whole or part thereof can be configured in such a manner as to be dispersed or integrated functionally or physically in an arbitrary unit according to various kinds of loads, the use status, and so forth. For example, in the processing apparatus 1, the display control section 421 and the change section 422 may be functionally integrated or combined.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A processing apparatus comprising:
   a holding table that holds a workpiece;
   a processing unit that processes the workpiece held by the holding table;
   a control unit that drives the processing unit; and
   a display part that displays information relating to processing, wherein
   the control unit includes:
      a processing condition storing section that stores processing condition data of the processing apparatus, and
      a display control section that causes the display part to display a processing condition screen relating to the processing condition data, and
   the display control section causes the processing condition screen to display function objects that allow identification of functions to be executed on the workpiece on a basis of the processing condition data by the processing apparatus.

2. The processing apparatus according to claim 1, wherein:
   the display control section causes the processing condition screen to display the function objects of the functions to be executed based on the processing condition data by the processing apparatus and second function objects of functions that are not to be executed in different display forms.

3. The processing apparatus according to claim 2, wherein:
   the processing condition screen includes a screen that allows change in a function to be executed and order of a function to be executed, and
   the control unit further includes a change section that changes a function that is not to be executed to a function to be executed when the second function object of the function that is not to be executed is moved to a position adjacent to the function object of a function to be executed in the processing condition screen.

4. The processing apparatus according to claim 1, wherein:
   the display control section causes the processing condition screen to display the function objects indicating the functions to be executed based on the processing condition data by the processing apparatus in such a manner as to line up the function objects in order of execution.

5. The processing apparatus according to claim 1, wherein the functional objects include at least one function chosen from the following: an alignment function; a set up function of inserting a cutting blade; a cutting function of executing cutting processing; an auto blade changing function; a measuring function of measuring a thickness of the workpiece; a precutting function of cutting a precut board to execute dressing of a blade; a cleaning function of cleaning the workpiece; an imaging function of imaging a cutting mark formed through cutting into a dummy wafer and accurately measuring the outer diameter of a blade of the processing apparatus from an image obtained by the imaging; a measuring function of measuring vibrations by an AE sensor; and a Kerf Check function of imaging a cut groove of the workpiece.

6. The processing apparatus according to claim 5, wherein the functional objects include at least the following functions: the alignment function; the cutting function; and the Kerf Check function.

7. The processing apparatus according to claim 5, wherein the functional objects include at least the following functions: the precutting function; the alignment function; the setup function; and the cutting function.

8. The processing apparatus according to claim 5, wherein the functional objects include at least the following functions: the Kerf Check function; the setup function; and the cleaning function.

9. The processing apparatus according to claim 1, wherein the display part also displays an order change screen with which the functions of a processing condition are changed.

10. The processing apparatus according to claim 9, wherein the order change screen includes a first display region which indicates the flow of functions to be executed from processing preparation to the processing end, and a second display region which indicates functions that are invalid.

11. The processing apparatus according to claim 1, wherein the display part displays a detailed setting screen, which indicates the leading detailed condition of the selected processing condition, wherein the settings of the detailed condition corresponding to a function of the processing condition are changed on the detailed setting screen.

12. The processing apparatus according to claim 1, wherein the display section is located on a touch panel of the processing apparatus.

13. The processing apparatus according to claim 1, wherein the processing unit includes an X-axis movement means, a Y-axis movement means, and a Z-axis movement means.

* * * * *

UNITED STATES PATENT AND TRADEMARK OFFICE
CERTIFICATE OF CORRECTION

PATENT NO. : 11,768,478 B2
APPLICATION NO. : 17/653770
DATED : September 26, 2023
INVENTOR(S) : Takafumi Omori It is certified that error appears in the above-identified patent and that said Letters Patent is hereby corrected as shown below:

In the Claims

Column 17, Line 28, Claim 1, delete "wherein" and insert -- wherein: --.

Column 17, Line 45, Claim 2, between the words "executed" and "based", insert -- on the workpiece --.

Column 17, Line 52, Claim 3, between the words "executed" and "and", insert -- on the workpiece --.

Column 17, Line 53, Claim 3, between the words "executed" and ", and", insert -- on the workpiece --.

Column 17, Line 55, Claim 3, between the words "executed" and "to", insert -- on the workpiece --.

Column 17, Line 56, Claim 3, between the words "executed" and "when", insert -- on the workpiece --.

Column 18, Line 5, Claim 4, between the words "executed" and "based", insert -- on the workpiece --.

Column 18, Line 42-43, Claim 10, between the words "executed" and "from", insert -- on the workpiece --.

Signed and Sealed this
Fifth Day of December, 2023

Katherine Kelly Vidal
*Director of the United States Patent and Trademark Office*